(12) United States Patent
Huang et al.

(10) Patent No.: US 9,215,763 B2
(45) Date of Patent: Dec. 15, 2015

(54) PULSE CURRENT LED DRIVING CIRCUIT

(71) Applicant: Silergy Semiconductor Technology (Hangzhou) LTD, Hangzhou, ZheJiang Province (CN)

(72) Inventors: Xiaodong Huang, Hangzhou (CN); Chen Zhao, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

(21) Appl. No.: 14/527,342

(22) Filed: Oct. 29, 2014

(65) Prior Publication Data

US 2015/0115814 A1    Apr. 30, 2015

(30) Foreign Application Priority Data

Oct. 31, 2013    (CN) .......................... 2013 1 0534611

(51) Int. Cl.
| H05B 37/00 | (2006.01) |
| H05B 39/00 | (2006.01) |
| H05B 41/00 | (2006.01) |
| H05B 33/08 | (2006.01) |

(52) U.S. Cl.
CPC ............ *H05B 33/08* (2013.01); *H05B 33/0812* (2013.01)

(58) Field of Classification Search
None
See application file for complete search history.

(56) References Cited

U.S. PATENT DOCUMENTS

| 8,164,275 B2 * | 4/2012 | Doudousakis et al. ....... 315/291 |
| 8,796,931 B2 | 8/2014 | Savage, Jr. |
| 8,810,147 B2 | 8/2014 | Hsieh |
| 8,816,597 B2 | 8/2014 | Suzuki |
| 2012/0249000 A1 * | 10/2012 | Kawai et al. .............. 315/200 R |
| 2013/0328492 A1 | 12/2013 | Hsien |

FOREIGN PATENT DOCUMENTS

CN        201967222 U    9/2011

* cited by examiner

*Primary Examiner* — Anh Tran
(74) *Attorney, Agent, or Firm* — Michael C. Stephens, Jr.

(57) ABSTRACT

In one embodiment, a pulse current light-emitting diode (LED) driving circuit, can include: (i) an AC power supply configured to generate an AC input; (ii) a rectifier circuit that receives the AC input voltage, and generates a DC input voltage; (iii) a sampling circuit that receives the DC input voltage, and generates a DC sense voltage; (iv) a comparison circuit that receives the DC sense voltage, and generates a first comparison signal; (v) a feedback compensating circuit that samples a current that flows through a transistor, and generates a compensation signal; (vi) a signal processing circuit that receives the first comparison signal and the compensation signal, and generates an on signal; and (vii) the transistor having a gate configured to receive the on signal, a drain configured to receive the DC input voltage, and a source coupled to a first terminal of a sampling resistor.

11 Claims, 7 Drawing Sheets

US 9,215,763 B2

PULSE CURRENT LED DRIVING CIRCUIT

RELATED APPLICATIONS

This application claims the benefit of Chinese Patent Application No. 201310534611.X, filed on Oct. 31, 2013, which is incorporated herein by reference in its entirety.

FIELD OF THE INVENTION

The present invention relates to regulation circuitry, and more particularly to a pulse current LED driving circuit.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

SUMMARY

In one embodiment, a pulse current light-emitting diode (LED) driving circuit, can include: (i) an AC power supply configured to generate an AC input; (ii) a rectifier circuit configured to receive the AC input voltage, and to generate a DC input voltage; (iii) a sampling circuit configured to receive the DC input voltage, and to generate a DC sense voltage; (iv) a comparison circuit configured to receive the DC sense voltage, and to generate a first comparison signal; (v) a feedback compensating circuit configured to sample a current that flows through a transistor, and to generate a compensation signal; (vi) a signal processing circuit configured to receive the first comparison signal and the compensation signal, and to generate an on signal, where the signal processing circuit comprises a filter circuit configured to smooth rising edges and falling edges of the on signal; and (vii) the transistor having a gate configured to receive the on signal, a drain configured to receive the DC input voltage, and a source coupled to a first terminal of a sampling resistor, where a second terminal of the sampling resistor is coupled to a first terminal of a load, and a second terminal of the load is coupled to ground, and where the transistor is turned on and a drain-source current is generated to drive the load when the on signal is active.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

In a switching power supply, such as a pulse current light-emitting diode (LED) driving circuit, a voltage across a power switch (e.g., a transistor), and a current flowing the power switch may change relatively quickly when turning on/off the power switch. This can result in poor electro-magnetic compatibility (EMC) of the switching power supply. Traditionally, EMC may be improved by applying an EMC filter in a circuit, but this approach may suffer from problems including relatively complicated circuitry, a relatively large circuit volume, and relatively high product costs.

Figure 1:
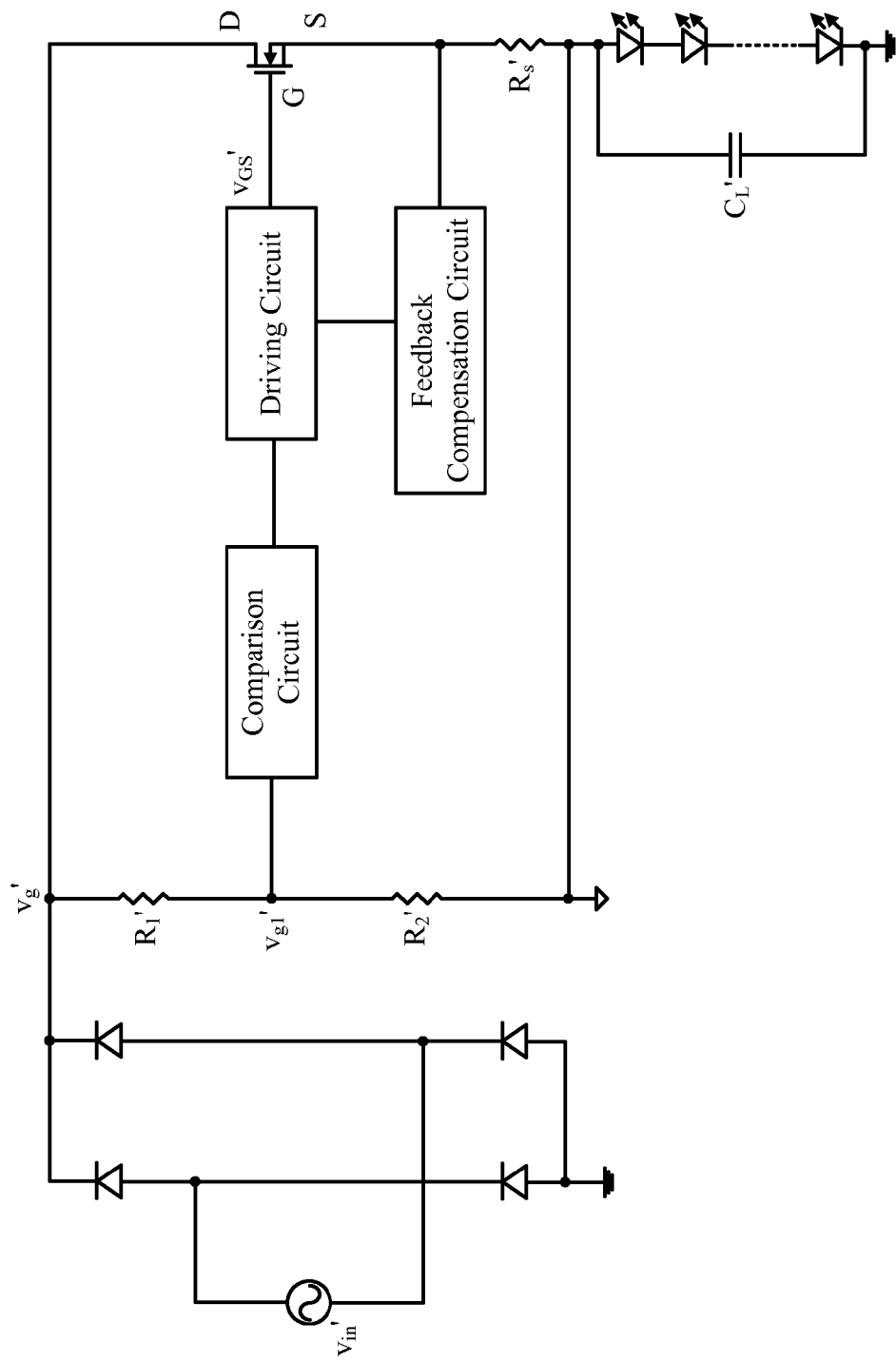
FIG. 1 is a schematic block diagram of an example LED driving circuit.

Referring now to FIG. 1, shown is a schematic block diagram of an example LED driving circuit. This particular example LED driving circuit can include an AC power supply, a rectifier circuit, resistor $R_1'$, resistor $R_2'$, a comparison circuit, a feedback compensation circuit, a driving circuit, and a load. The load can include a voltage-stabilising capacitor (e.g., $C_L'$) and an LED group connected in parallel. The AC power supply can generate AC input voltage and $v_{in}'$, may provide to the rectifier circuit. The rectifier circuit can generate DC input voltage $v_g'$ by rectifying AC input voltage $v_{in}'$. Resistors $R_1'$ and $R_2'$ can be used to sample DC input voltage $v_g'$, and to generate DC sense voltage $v_{g1}'$.

The comparison circuit can receive DC sense voltage $v_{g1}'$, and may generate a comparison signal, which can be provided to the driving circuit. The feedback compensation circuit can sample a current flowing the transistor as shown, and may generate a compensation signal (e.g., via a compensation calculation). The driving circuit can receive the comparison signal and the compensation signal, and may generate driving signal $v_{GS}'$. The transistor can receive driving signal $v_{GS}'$ at its gate and DC input voltage $v_g'$ at its drain. The transistor can connect to a first terminal of the load through a sampling resistor at its source, and a second terminal of the load may be grounded. When driving signal $v_{GS}'$ is active, the transistor may be turned on, and drain-source $i_{DS}'$ may be generated to drive the load.

Figure 2:
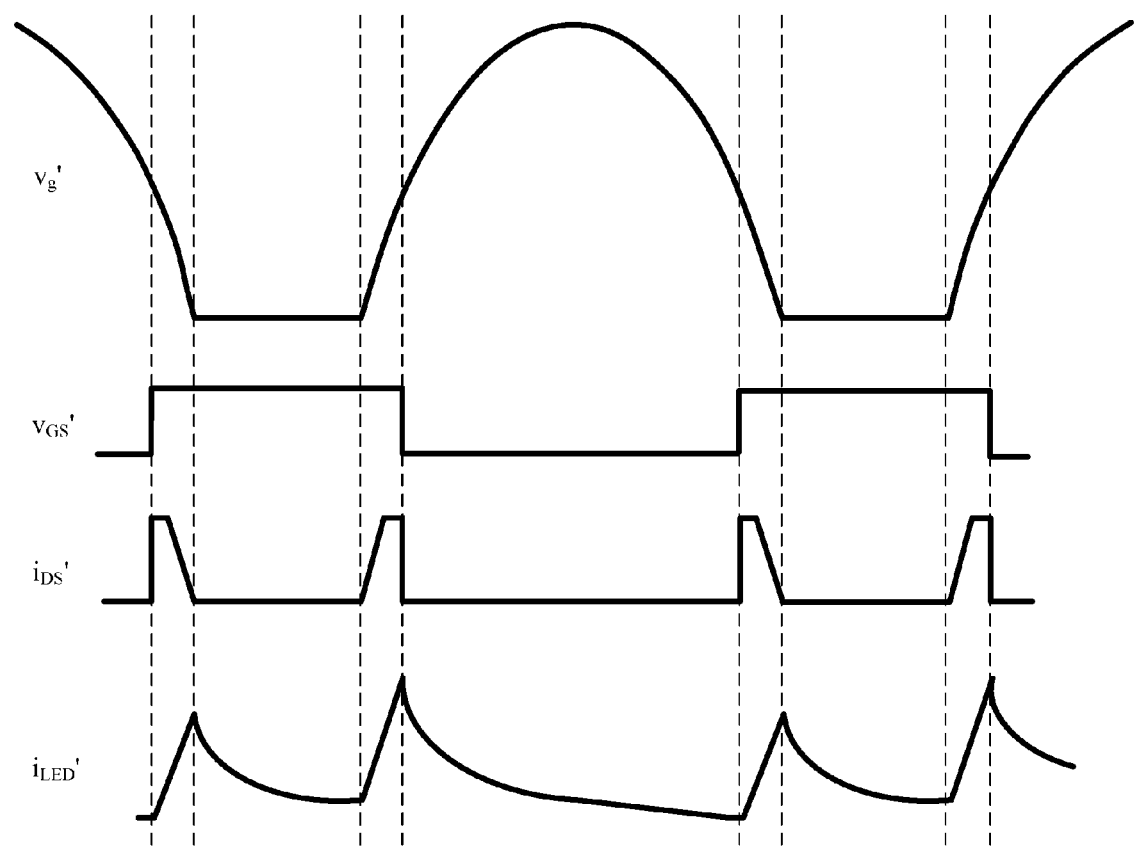
FIG. 2 is a waveform diagram of example operation of the LED driving circuit of FIG. 1.

Referring now to FIG. 2, shown is a waveform diagram of example operation of the LED driving circuit of FIG. 1. The operation waveforms include rectified DC input voltage $v_g'$, transistor driving signal $v_{GS}'$, drain-source current $i_{DS}'$, and pulse current $i_{LED}'$ flowing through the LED group. Because of the relatively rapid rate of change of driving signal $v_{GS}'$, a large transient pulse can occur in pulse current $i_{LED}'$ of the LED group. This can result in poor EMC of the switching power supply.

In one embodiment, a pulse current light-emitting diode (LED) driving circuit, can include: (i) an AC power supply configured to generate an AC input; (ii) a rectifier circuit configured to receive the AC input voltage, and to generate a DC input voltage; (iii) a sampling circuit configured to receive the DC input voltage, and to generate a DC sense voltage; (iv) a comparison circuit configured to receive the DC sense voltage, and to generate a first comparison signal; (v) a feedback compensating circuit configured to sample a current that flows through a transistor, and to generate a compensation signal; (vi) a signal processing circuit configured to receive the first comparison signal and the compensation signal, and to generate an on signal, where the signal processing circuit comprises a filter circuit configured to smooth rising edges and falling edges of the on signal; and (vii) the transistor having a gate configured to receive the on signal, a drain configured to receive the DC input voltage, and a source coupled to a first terminal of a sampling resistor, where a second terminal of the sampling resistor is coupled to a first terminal of a load, and a second terminal of the load is coupled to ground, and where the transistor is turned on and a drain-source current is generated to drive the load when the on signal is active.

Figure 3:
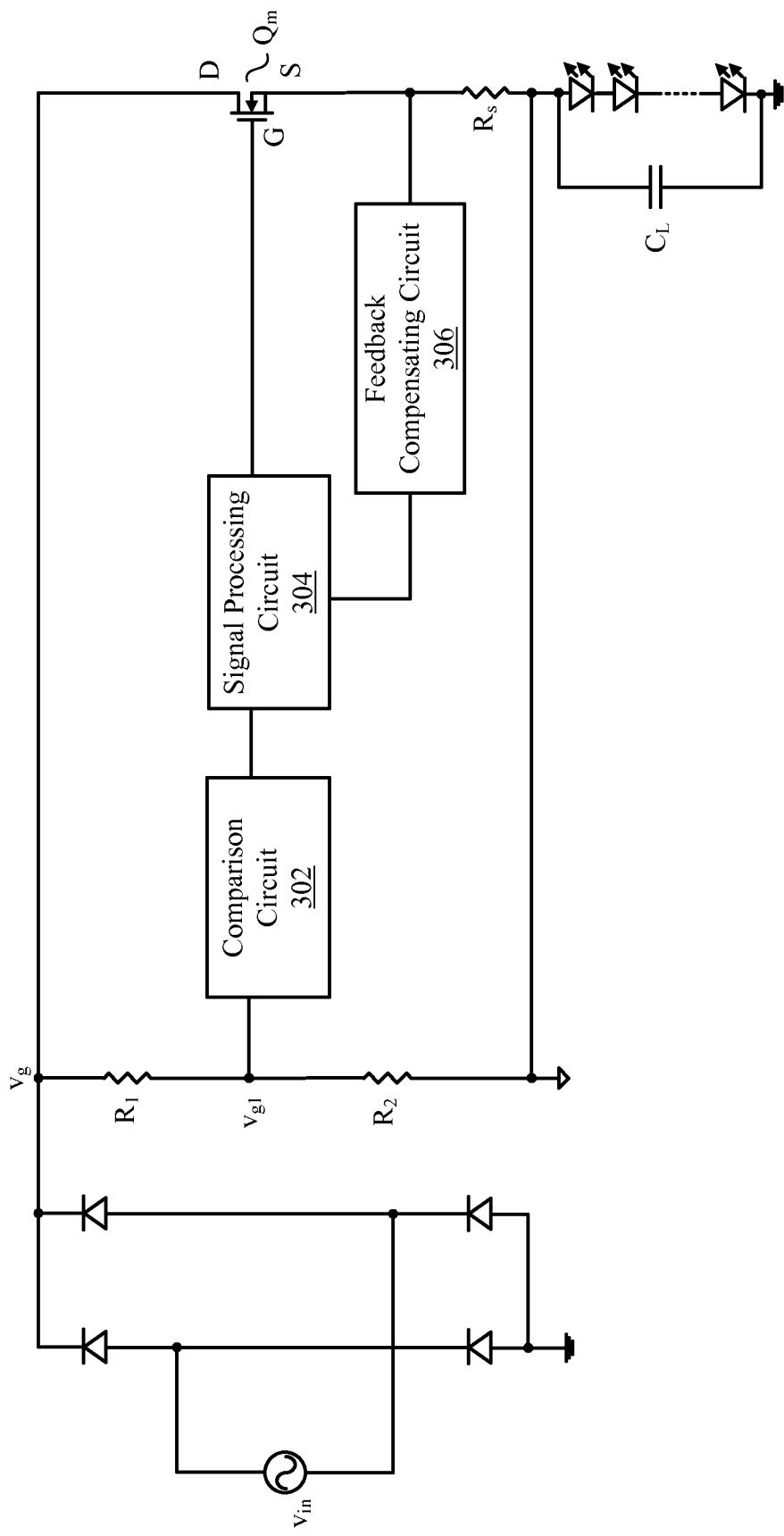
FIG. 3 is a schematic block diagram of an example pulse current LED driving circuit, in accordance with embodiments of the present invention.

Referring now to FIG. 3, shown is a schematic block diagram of an example pulse current LED driving circuit, in accordance with embodiments of the present invention. In this example, a pulse current LED driving circuit can include an AC power supply, a rectifier circuit, a sampling circuit, comparison circuit 302, signal processing circuit 304, feedback compensating circuit 306, switch (e.g., transistor) $Q_m$, and a load (e.g., an LED load). The AC power supply can generate an AC input voltage $v_{in}$, and the rectifier circuit can receive AC input voltage $v_{in}$. The rectifier circuit can generate DC input voltage $v_g$ (e.g., by rectification). The sampling circuit may receive DC input voltage $v_g$, and can generate DC sense voltage $v_{g1}$ (e.g., by sampling).

Comparison circuit 302 may receive DC sense voltage $v_{g1}$, and can generate a first comparison signal, which can be provided to signal processing circuit 304. Feedback compensating circuit 306 can sample a current that flows through transistor $Q_m$, and may generate a compensation signal (e.g., via a compensation operation). Signal processing circuit 304 can receive the first comparison signal and the compensation signal, and may generate on signal $v_{GS}$ to control transistor $Q_m$. For example, rising and falling edges of on signal $v_{GS}$ may be relatively gentle (e.g., due to a filter circuit). Transistor $Q_m$ can receive on signal $v_{GS}$ at its gate and DC input voltage $v_g$ at its drain. A source of transistor $Q_m$ can connect to a first terminal of sampling resistor $R_s$. A second terminal of sampling resistor $R_s$ can connect to a first terminal of the load, and a second terminal of the load may be grounded. When on signal $v_{GS}$ is active, transistor $Q_m$ may be turned on, and drain-source current $i_{DS}$ may be generated to drive the load.

Figure 4:
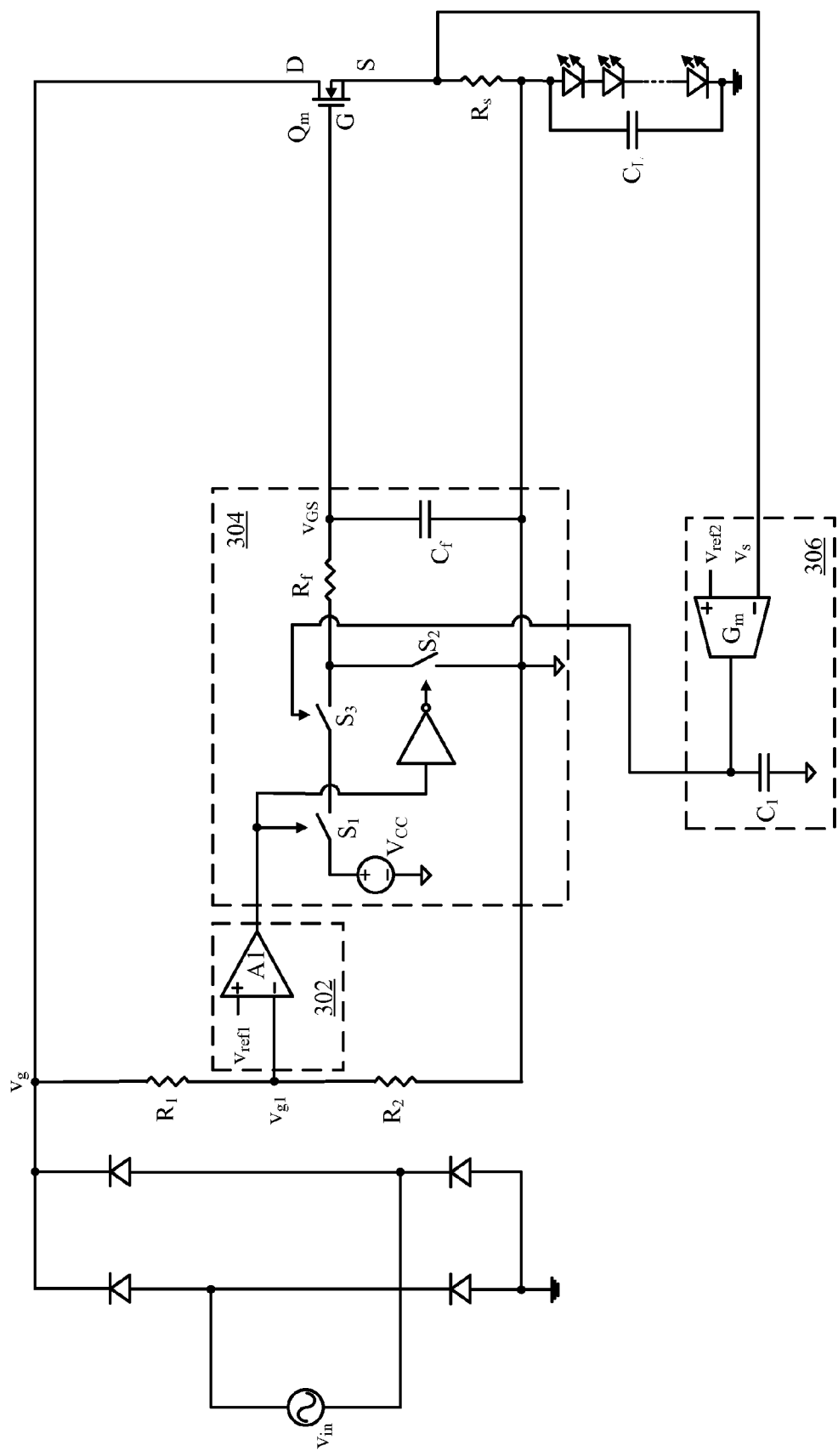
FIG. 4 is a schematic block diagram of a more detailed example pulse current LED driving circuit, in accordance with embodiments of the present invention.

Referring now to FIG. 4, shown is a schematic block diagram of a more detailed example pulse current LED driving circuit, in accordance with embodiments of the present invention. In this particular example, the sampling circuit can include resistors $R_1$ and $R_2$, where resistor $R_1$ may have a first terminal for receiving DC input voltage $v_g$, and a second terminal coupled to comparison circuit 302 to provide DC sense voltage $v_{g1}$. Resistor $R_2$ may have a first terminal coupled to the second terminal of resistor $R_1$, and a second terminal coupled to the second terminal of sampling resistor $R_s$. Furthermore, comparison circuit 302 can include comparator A1 that can receive DC sense voltage $v_{g1}$ and reference voltage $v_{ref1}$, and may generate the first comparison signal, which can be provided to signal processing circuit 304.

Feedback compensating circuit 306 can include transconductance operational amplifier $G_m$ and compensation capacitor $C_1$. Transconductance operational amplifier $G_m$ may have an inverting input terminal for receiving transistor sense voltage $v_s$ generated at the first terminal of sampling resistor $R_s$, a non-inverting input terminal for receiving reference voltage $v_{ref2}$, and an output terminal for generating a current signal. The current signal can be generated by comparing transistor sense voltage $v_s$ against reference voltage $v_{ref2}$. Compensation capacitor $C_1$ may have a first terminal for receiving the current signal, and a second terminal that is grounded. For example, the compensation signal may be generated at the first terminal of compensation capacitor $C_1$ (e.g., for signal processing circuit 304) by charging compensation capacitor $C_1$ via the current signal.

Signal processing circuit 304 can include DC voltage source $V_{cc}$, switches $S_1$, $S_2$, and $S_3$, an inverter, and a filter circuit. DC voltage source $V_{cc}$, and switches $S_1$, $S_3$, and $S_2$ may be coupled in series. Switch $S_1$ can be controllable by the first comparison signal such that when the first comparison signal is active, switch $S_1$ may be on. A complementary comparison signal may be generated through the inverter in response to the first comparison signal, and switch $S_2$ may be controllable by the complementary comparison signal. Thus, when the complementary signal is active, switch $S_2$ may be on. Switch $S_3$ may be controllable by the compensation signal such that when the compensation signal is active, switch $S_3$ may be on. Also, the filter circuit can connect at two terminals of switch $S_2$. When switches $S_1$ and $S_3$ are on, and switch $S_2$ is off, the filter circuit can receive a DC voltage generated by DC voltage source $V_{cc}$, and may generate on signal $v_{GS}$, which can be provided to transistor $Q_m$.

The filter circuit can include filter resistor $R_f$ and filter capacitor $C_f$. Filter resistor $R_f$ may have a first terminal coupled a common node of switches $S_2$ and $S_3$, and a second terminal coupled to a first terminal of filter capacitor $C_f$ (also coupled the gate of transistor $Q_m$. A second terminal of filter capacitor $C_f$ can connect to a second terminal of switch $S_2$ and the second terminal of sampling resistor $R_s$. Further, the load can include an LED group including a plurality of series-coupled LEDs, and voltage-stabilizing capacitor $C_L$ which can connect in parallel with the LED group. A first common node of the LED group and voltage-stabilizing capacitor $C_L$ can connect to the second terminal of sampling resistor $R_s$, and a second common node of the LED group and voltage-stabilizing capacitor $C_L$ can connect to ground. Note that the common node among resistor $R_2$, filter capacitor $C_f$, switch $S_2$, and sampling resistor $R_s$, as well as the LED group at the first common node can connect to a ground that may be a different ground from that of the rectifier circuit and/or the second common node of the LED group and voltage-stabilizing capacitor $C_L$.

Figure 5:
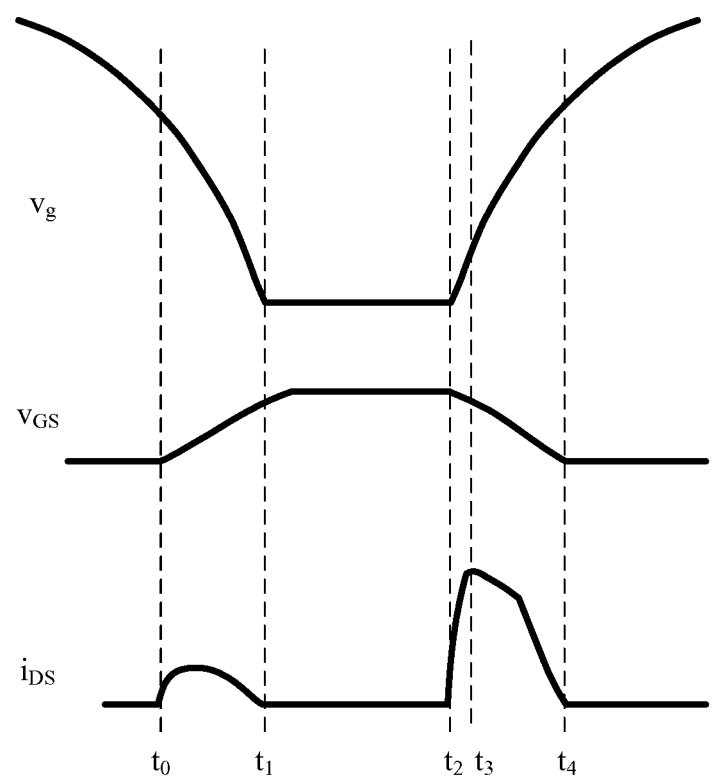
FIG. 5 is a waveform diagram of example operation of the pulse current LED driving circuit of FIG. 4, in accordance with embodiments of the present invention.

Referring now to FIG. 5, shown is a waveform diagram of example operation of the pulse current LED driving circuit of FIG. 4, in accordance with embodiments of the present invention. AC input voltage output by the AC power supply may be rectified by the rectifier circuit (e.g., a full wave rectifier circuit), to obtain the DC input voltage $v_g$. DC input voltage $v_g$ can be provided to the drain of transistor $Q_m$ such that drain-source current $i_{DS}$ can be instantly generated after transistor $Q_m$ is turned on. Resistors $R_1$ and $R_2$ can be used to sample DC input voltage $v_g$, and to generate DC sense voltage $v_{g1}$, which can connect to the inverting input terminal of comparator A1. During one input cycle of DC input voltage $v_g$, when a voltage of the falling edge decreases to a level of reference voltage $v_{ref1}$ (e.g., at time $t_0$), comparator A1 may output a high level to turn on switch $S_1$ in signal processing circuit 304.

Transconductance operational amplifier $G_m$ in feedback compensating circuit 306 can receive sense voltage $v_s$ at its inverting input terminal. For example, sense voltage $v_s$ can be generated at the source of transistor $Q_m$ and may be less than reference voltage $v_{ref2}$. In some cases, reference voltage $v_{ref2}$ may be a voltage that represents drain-source current $i_{DS}$ of transistor $Q_m$. A high level may be generated by charging compensation capacitor $C_1$ via the current signal output by transconductance operational amplifier $G_m$, in order to turn on switch $S_3$ in signal processing circuit 304.

Because the complementary comparison signal may an inverted version of the first comparison signal, switch $S_2$ may be turned off when the complementary comparison signal is low. A voltage signal output by DC voltage source $V_{cc}$ may be supplied to filter capacitor $C_f$ through filter resistor $R_f$, and may be used to on signal $v_{GS}$, which can control transistor $Q_m$. For example, on signal $v_{GS}$ may rise gently (e.g., without substantial ripples) by charging filter capacitor $C_f$, and thus drain-source current $i_{DS}$ of transistor $Q_m$ may be generated in response to on signal $v_{GS}$ being activated, in order to drive the LED load. When a voltage of the first falling edge of the DC input voltage $v_g$ in FIG. 5 is decreased to zero (e.g., at time $t_1$), drain-source current $i_{DS}$ through transistor $Q_m$ may be zero, and the LED group may be powered by voltage-stabilizing capacitor $C_L$ for continuous operation. Also, on signal $v_{GS}$ can continue rising until reaching an operating voltage when transistor $Q_m$ is in the saturation state.

When DC input voltage $v_g$ starts rising at time $t_2$, on signal $v_{GS}$ may be still be active such that transistor $Q_m$ may be saturated, and drain-source current $i_{DS}$ may suddenly rise. Also, sense voltage $v_s$ (e.g., obtained via sampling resistor $R_s$) may increase to be greater than reference voltage $v_{ref2}$. In this case, the compensation signal may go low to turn off switch $S_3$ and filter capacitor $C_f$ can begin to discharge. On signal $v_{GS}$ can gradually decrease, and drain-source current $i_{DS}$ can also decrease along with on signal $v_{GS}$. This can occur until the voltage at the rising edge of DC input voltage $v_g$ (or DC sense voltage $v_{g1}$) is greater than reference voltage $v_{ref1}$ (e.g., at time $t_4$). The first comparison signal may be inactive, switch $S_1$ may be off, and switch $S_2$ may be on. In this case, on signal $v_{GS}$ may be discharged (e.g., to zero) relatively quickly, and drain-source current $i_{DS}$ may also be reduced to zero.

To begin a new cycle, the compensation signal may be activated again, and switch $S_3$ may be turned on again. As shown in FIG. 5, the rising and falling edges of on signal $v_{GS}$ for transistor $Q_m$ may be relatively smooth, and as a result the pulse current of transistor $Q_m$ may also be relatively smooth. In this way, EMC of the pulse current LED driving circuit of particular embodiments may be improved over conventional approaches, potentially without substantial increases to circuit complexity, volume and/or product costs.

Figure 6:
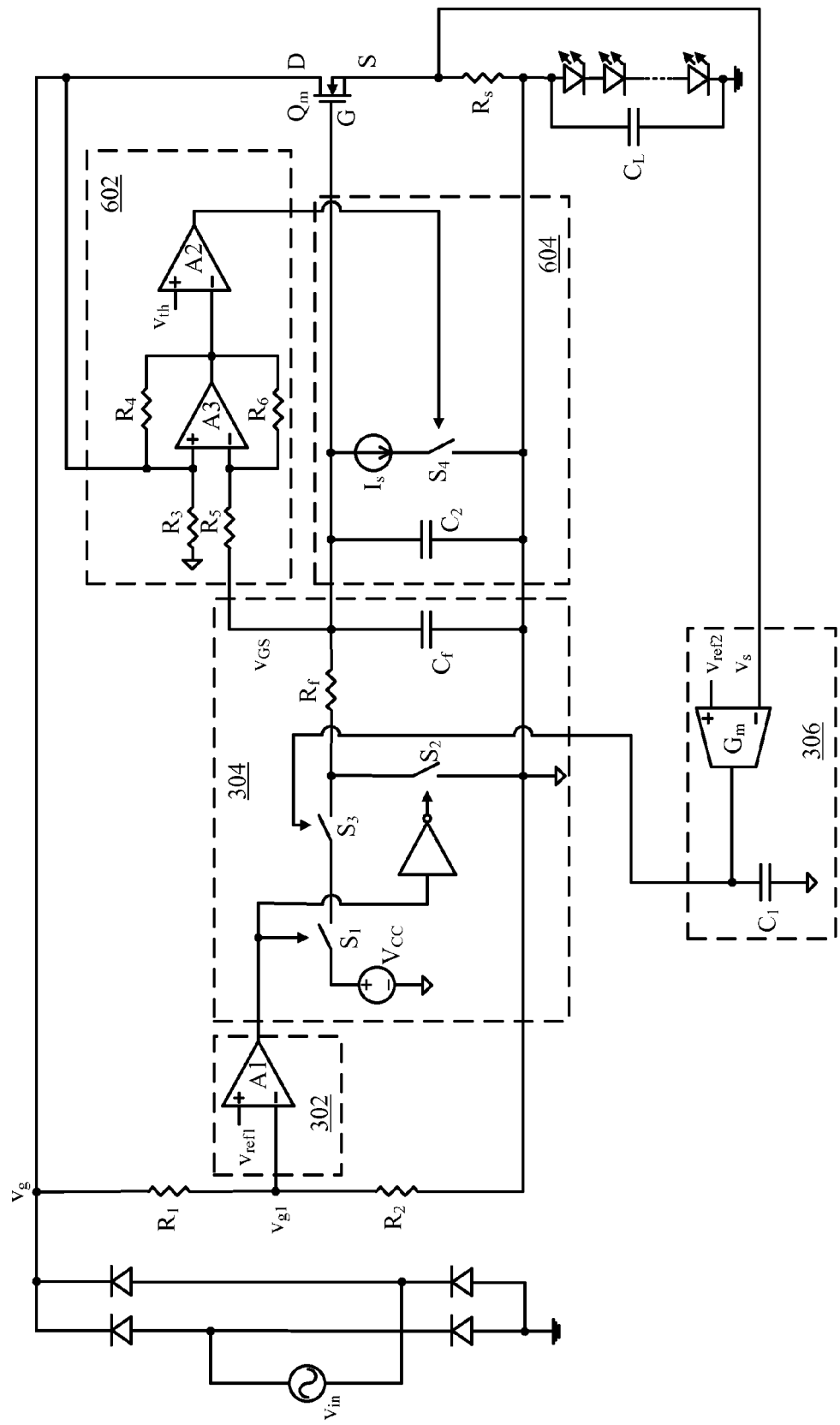
FIG. 6 is a schematic block diagram of an example pulse current LED driving circuit, in accordance with embodiments of the present invention.

Referring now to FIG. 6, shown is a schematic block diagram of an example pulse current LED driving circuit, in accordance with embodiments of the present invention. In this particular example, the pulse current LED driving circuit can also include transistor state judge circuit 602 and discharging circuit 604. Transistor state judge circuit 602 may be used to monitor states of transistor $Q_m$, and to generate a second comparison signal, which can be provided to discharging circuit 604. When drain-source current $i_{DS}$ reaches a peak value, transistor $Q_m$ may be in the saturation state, and the second comparison signal may be activated as a result. In this case, discharging circuit 604 can generate a regulating signal to pull down or discharge on signal $v_{GS}$.

For example, transistor state judge circuit 602 can include a subtraction circuit and comparator A2. The subtraction circuit can receive on signal $v_{GS}$ and DC input voltage $v_g$, and can perform a difference calculation on signal $v_{GS}$ and DC input voltage $v_g$, to generate a difference voltage. Also, comparator A2 may have an inverting input terminal for receiving the difference voltage, a non-inverting input terminal for receiving turn-on (e.g., threshold) voltage $v_{th}$ of transistor $Q_m$, and an output terminal for generating the second comparison signal, which can be provided to discharging circuit 604.

For example, subtraction circuit can include operational amplifier A3, and resistors $R_3$, $R_4$, $R_5$, and $R_6$. Resistor $R_3$ may have a first terminal coupled to a non-inverting input terminal of operational amplifier A3, and a second terminal coupled to the second terminal of sampling resistor $R_s$. Resistor $R_4$ may have a first terminal coupled to a non-inverting input terminal of operational amplifier A3, and a second terminal coupled to an output terminal of operational amplifier A3. Also, resistor $R_5$ may have a first terminal coupled to an inverting input terminal of operational amplifier A3, and a second terminal for receiving on signal $v_{GS}$. Resistor $R_6$ may have a first terminal coupled to an inverting input terminal of operational amplifier A3, and a second terminal coupled to the output terminal of operational amplifier A3. Further, the non-inverting input terminal of operational amplifier A3 can also receive DC input voltage $v_g$. Operational amplifier A3 can compare on signal $v_{GS}$ against DC input voltage $v_g$, and may generate the difference voltage.

Discharging circuit 604 can include DC current source $I_s$, switch $S_4$, and discharging capacitor $C_2$. DC current source $I_s$ may have a negative pole or terminal coupled to a first terminal of switch $S_4$, a positive pole/terminal coupled to a negative pole/terminal of discharging capacitor $C_2$, which also can also on signal $v_{GS}$. A positive pole/terminal of discharging capacitor $C_2$ can connect to a second terminal of switch $S_4$. Switch $S_4$ can be controlled by the second comparison signal. When the second comparison signal is active, switch $S_4$ may be turned on, discharging capacitor $C_2$ may be discharged through DC current source $I_s$, and the regulation signal may be generated to discharge on signal $v_{GS}$. For example, discharging capacitor $C_2$ may have a negative pole/terminal coupled to the first terminal of filter capacitor $C_f$, and a positive pole/terminal coupled to the second terminal of filter capacitor $C_f$.

Figure 7:
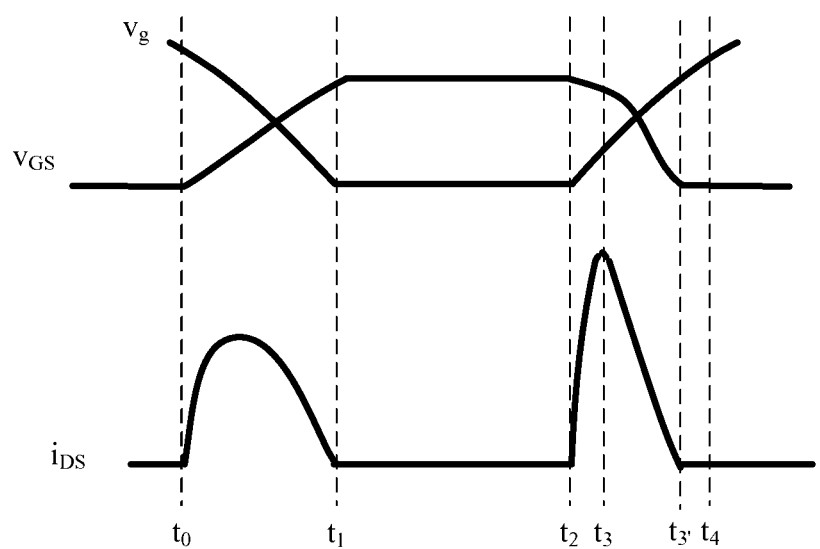
FIG. 7 is a waveform diagram of example operation of the pulse current LED driving circuit of FIG. 6, in accordance with embodiments of the present invention.

Referring now to FIG. 7, shown is a waveform diagram of example operation of the pulse current LED driving circuit of FIG. 6, in accordance with embodiments of the present invention. AC input voltage $v_{in}$ output by the AC power supply may be rectified by the rectifier circuit (e.g., a full wave rectifier circuit), in order to obtain DC input voltage $v_g$. DC input voltage $v_g$ may be input to the drain of transistor $Q_m$, such that drain-source current $i_{DS}$ may be generated instantly after transistor $Q_m$ is turned on.

Resistors $R_1$ and $R_2$ can be used to sample DC input voltage $v_g$, and to generate DC sense voltage $v_{g1}$, which can be provided to the inverting input terminal of comparator A1. During one input cycle of DC input voltage $v_g$ (e.g., before time $t_0$), the subtraction circuit in transistor state judge circuit 602 can output the difference voltage of on signal $v_{GS}$ and DC input voltage $v_g$. For example, the difference voltage may be less than turn-on (e.g., threshold) voltage $v_{th}$, and comparator A2 can output a high level to turn on switch $S_4$. However, as DC sense voltage $v_{g1}$ may remain greater than reference voltage $v_{ref1}$, the first comparison signal output by comparator A1 may be inactive, switch $S_1$ may be off, and switch $S_2$ may be. In this case, filter capacitor $C_f$ can discharge, and the voltage across discharging capacitor $C_2$ can also change along with that of filter capacitor $C_f$.

When the voltage of the falling edge of DC input voltage $v_g$ is decreased to a level of reference voltage $v_{ref1}$ (e.g., at time $t_0$), comparator A1 can output a high level to turn on switch $S_1$ in signal processing circuit 304. Transconductance operational amplifier $G_m$ in feedback compensating circuit 306 can receive sense voltage $v_s$ at its inverting input terminal, and sense voltage $v_s$ may be obtained at the source of transistor $Q_m$. For example, sense voltage $v_s$ may be less than reference voltage $v_{ref2}$, and reference voltage $v_{ref2}$ can be a voltage that represents drain-source current $i_{DS}$ of transistor $Q_m$). A high level may be generated by charging compensation capacitor $C_1$ via the current signal output by transconductance operational amplifier $G_m$, in order to turn on switch $S_3$ in signal processing circuit 304.

The complementary comparison signal is an inverted version of the first comparison signal, and switch $S_2$ may be turned off when the complementary comparison signal is low. A voltage signal output by DC voltage source $V_{cc}$ may be supplied to filter capacitor $C_f$ through filter resistor $R_f$ for generating on signal $v_{GS}$, which can be provided to to transistor $Q_m$. The regulating signal generated on discharging capacitor $C_2$ can discharge on signal $v_{GS}$. However, on signal $v_{GS}$ may still gently rise by charging filter capacitor $C_f$, and thus drain-source current $i_{DS}$ of transistor $Q_m$ may be generated when on signal $v_{GS}$ is activated, in order to drive the LED load.

Because on signal $v_{GS}$ may gradually increase, when the difference between on signal $v_{GS}$ and DC input voltage $v_g$ is greater than turn-on voltage $v_{th}$, comparator A2 can output a low level. In this case, switch $S_4$ may be off, and the voltage across discharging capacitor $C_2$ can equal that of filter capacitor $C_f$, and on signal $v_{GS}$ can continue to rise. When a voltage of the first falling edge (see, e.g., FIG. 7) of the DC input voltage $v_g$ is decreased to zero (e.g., at time $t_1$), drain-source current $i_{DS}$ may be zero. The LED group may be powered by voltage-stabilizing capacitor $C_L$ for continuous operation, and on signal $v_{GS}$ can rise until reaching the operation voltage when transistor $Q_m$ is in the saturation state.

When the first rising edge of the DC input voltage $v_g$ in FIG. 7 begins increasing at time $t_2$, on signal $v_{GS}$ may still be active such that transistor $Q_m$ is saturated. In this case, drain-source current $i_{DS}$ may suddenly rise, and sense voltage $v_s$ obtained via sampling resistor $R_s$ can rise to be greater than reference voltage $v_{ref2}$. Thus, the compensation signal may be inactive, and switch $S_3$ may be off. Also, filter capacitor $C_f$ may begin to discharge, and on signal $v_{GS}$ can gradually decrease. However, as the DC input voltage $v_g$ may be continuously rising, drain-source current $i_{DS}$ can also continue to rise until reaching the maximum value at time $t_3$.

The difference between $v_{GS}$ and $v_g$ may be less than turn-on voltage $v_{th}$, and comparator A2 can output a high level to turn on switch $S_4$. Also, discharging capacitor $C_2$ may be discharged via DC current source $I_s$, and on signal $v_{GS}$ may be instantly pulled down before time $t_4$. Thus, before the moment that the voltage of the first rising edge of DC input voltage $v_g$ is greater than reference voltage $v_{ref1}$, on signal $v_{GS}$ may be discharged to zero, and drain-source current $i_{DS}$ may also accordingly decreased to zero. Therefore, transistor $Q_m$ may be turned off in advance, such as at time $t_3$. When the voltage of the first rising edge of the DC input voltage $v_g$ is greater than reference voltage $v_{ref1}$ at time $t_4$, the first comparison signal may be inactive, switch $S_1$ may be turned off, and switch $S_2$ may be turned on. Discharging capacitor $C_2$ may be discharged, and switch $S_3$ may be turned on again when the compensation signal again becomes activated.

As shown in FIG. 7, the smooth rising and falling edges of on signal $v_{GS}$ for transistor $Q_m$ can lead to a relatively smooth pulse current wave of transistor $Q_m$, and the second pulse current wave may be almost a triangular shape. Thus, EMC of the pulse current LED driving current may be improved without increasing circuit complexity, circuit volume, and/or product cost. Further, transistor $Q_m$ may be turned off in advance (e.g., before time $t_4$) in order to prevent transistor $Q_m$ from being damaged, as well as to assure normal circuit operation. In this way, when rectified DC input voltage $v_g$ reaches a level of a threshold value (e.g., when $v_g$ is too large), transistor $Q_m$ may be quickly turned off to protect associated circuitry.

The embodiments were chosen and described in order to best explain the principles of the invention and its practical applications, to thereby enable others skilled in the art to best utilize the invention and various embodiments with modifications as are suited to the particular use contemplated. It is intended that the scope of the invention be defined by the claims appended hereto and their equivalents.

What is claimed is:

1. A pulse current light-emitting diode (LED) driving circuit, comprising:
   a) an AC power supply configured to generate an AC input;
   b) a rectifier circuit configured to receive said AC input voltage, and to generate a DC input voltage;
   c) a sampling circuit configured to receive said DC input voltage, and to generate a DC sense voltage;
   d) a comparison circuit configured to receive said DC sense voltage, and to generate a first comparison signal;
   e) a feedback compensating circuit configured to sample a current that flows through a transistor, and to generate a compensation signal;
   f) a signal processing circuit configured to receive said first comparison signal and said compensation signal, and to generate an on signal, wherein said signal processing circuit comprises a filter circuit configured to smooth rising edges and falling edges of said on signal; and
   g) said transistor having a gate configured to receive said on signal, a drain configured to receive said DC input voltage, and a source coupled to a first terminal of a sampling resistor, wherein a second terminal of said sampling resistor is coupled to a first terminal of a load, and a second terminal of said load is coupled to ground, and wherein said transistor is turned on and a drain-source current is generated to drive said load when said on signal is active.

2. The pulse current LED driving circuit of claim 1, wherein said sampling circuit comprises:
   a) a first resistor having a first terminal configured to receive said DC input voltage, and a second terminal coupled to said comparison circuit to provide said DC sense voltage; and
   b) a second resistor having a first terminal coupled to said second terminal of said first resistor, and a second terminal coupled to said second terminal of said sampling resistor.

3. The pulse current LED driving circuit of claim 1, wherein said comparison circuit comprises a first comparator having an inverting input terminal configured to receive said DC sense voltage, a non-inverting input terminal configured to receive a first reference voltage, and an output terminal configured to provide said first comparison signal.

4. The pulse current LED driving circuit of claim 1, wherein said feedback compensating circuit comprises:
   a) a transconductance operational amplifier configured to generate a current signal based on a comparison of a transistor sense voltage from said first terminal of said sampling resistor against a second reference voltage; and
   b) a compensation capacitor coupled to said current signal and to ground, wherein said compensation signal is generated at said compensation capacitor by charging said compensation capacitor via said current signal.

5. The pulse current LED driving circuit of claim 1, wherein said signal processing circuit comprises:
   a) a DC voltage source and first, second, and third switches coupled in series, wherein said first and second switches are controllable by said first comparison signal, and said third switch is controllable by said compensation signal; and
   b) said filter circuit being configured to receive a DC voltage generated by said DC voltage source, and to generate said on signal when said first and third switches are on, and said second switch is off.

6. The pulse current LED driving circuit of claim 5, wherein said filter circuit comprises:
   a) a filter resistor coupled to a common node of said second and third switches, and to said gate of said transistor; and
   b) a filter capacitor coupled to said filter resistor, said second switch, and said second terminal of said sampling resistor.

7. The pulse current LED driving circuit of claim 1, further comprising:
   a) a transistor state judge circuit configured to monitor a state of said transistor, and to generate a second comparison signal; and
   b) a discharging circuit configured to discharge said on signal when said transistor is in saturation state and said second comparison signal is active.

8. The pulse current LED driving circuit of claim 7, wherein said transistor state judge circuit comprises:
   a) a subtraction circuit configured to determine a difference between said on signal and said DC input voltage, and to generate a difference voltage; and
   b) a second comparator having an inverting input terminal configured to receive said difference voltage, a non-inverting input terminal configured to receive a turn-on voltage of said transistor, and an output terminal configured to generate said second comparison signal.

9. The pulse current LED driving circuit of claim 8, wherein said subtraction circuit comprises:
   a) a third resistor having a first terminal coupled to a non-inverting input terminal of an operational amplifier, and a second terminal coupled to said second terminal of said sampling resistor;
   b) a fourth resistor having a first terminal coupled to a non-inverting input terminal of said operational amplifier, and a second terminal coupled to an output terminal of said operational amplifier;
   c) a fifth resistor having a first terminal coupled to an inverting input terminal of said operational amplifier, and a second terminal coupled to said on signal;
   d) a sixth resistor having a first terminal coupled to an inverting input terminal of said operational amplifier, and a second terminal coupled to said output terminal of said operational amplifier; and
   e) said operational amplifier being configured to compare said on signal against said DC input voltage, and to generate said difference voltage.

10. The pulse current LED driving circuit of claim 7, wherein discharging circuit comprises:
    a) a DC current source coupled to said on signal and a fourth switch, wherein said fourth switch is controllable by said second comparison signal; and
    b) a discharging capacitor configured to be discharged through said DC current source when said second comparison signal is activated.

11. The pulse current LED driving circuit of claim 1, wherein said load comprises:
    a) an LED group comprising a plurality of series coupled LEDs; and
    b) a voltage-stabilising capacitor coupled in parallel with said LED group, wherein a first common node of said LED group and said voltage-stabilising capacitor is coupled to said second terminal of said sampling resistor, and a second common node of said LED group and said voltage-stabilising capacitor is coupled to ground.

* * * * *